United States Patent [19]

Arons et al.

[11] 4,217,386
[45] Aug. 12, 1980

[54] LAMINATED, HIGHLY SORBENT, ACTIVE CARBON FABRIC

[75] Inventors: Gilbert N. Arons, Newton Highlands; Richard N. Macnair, Cambridge, both of Mass.

[73] Assignee: The United States of America as represented by the Secretary of the Army, Washington, D.C.

[21] Appl. No.: 46,733

[22] Filed: Jun. 7, 1979

[51] Int. Cl.² .............................................. B32B 7/08
[52] U.S. Cl. ................................... 428/198; 156/182; 156/285; 156/290; 428/236; 428/246; 428/284; 428/286; 428/288; 428/296; 428/408; 428/902

[58] Field of Search ............... 428/198, 236, 246, 284, 428/286, 288, 296, 408, 902; 156/182, 285, 290

[56] References Cited

U.S. PATENT DOCUMENTS 3,769,144  10/1973  Economy .............................. 428/902

*Primary Examiner*—Marion McCamish
*Attorney, Agent, or Firm*—Nathan Edelberg; Robert P. Gibson; Lawrence E. Labadini

[57] ABSTRACT

A laminated, highly sorbent, active carbon fabric which is permeable to moisture vapor while sorbing substantial quantities of toxic chemical vapors, and process of making such a laminated fabric.

10 Claims, 2 Drawing Figures

LAMINATED, HIGHLY SORBENT, ACTIVE CARBON FABRIC

The invention described herein may be manufactured, used, and licensed by or for the Government for governmental purposes without the payment to us of any royalty thereon.

BACKGROUND OF THE INVENTION

This invention relates to a laminated, highly sorbent, active carbon fabric which is useful in clothing, face masks, and the like for protecting personnel against toxic chemical vapors.

Much effort has been directed in recent years to the development of fibers and fabrics to protect industrial and laboratory workers as well as firefighters, police and military personnel against the sorption of toxic chemical vapors to which they may be exposed in their normal working conditions or during special situations such as a gas attack during war. One of the more important considerations in the development of clothing for such purposes is that the heat load imposed on the wearer of the clothing be kept as low as possible. Hence, garment fabric systems that will breathe and have low levels of thermal insulation as well as sorb toxic chemical vapors are very important. Another desirable feature would be to isolate active carbon from sweat because the sorption capacity for other chemicals is reduced when sweat is sorbed.

It is, therefore, an object of the invention to provide a laminated, highly sorbent, active carbon fabric that will be permeable to moisture vapor, resistant to sweat penetration and have low levels of thermal insulation while being capable of sorbing substantial amounts of toxic chemical vapors and, therefore, of preventing such chemical vapors from penetrating through clothing made of such fabric to the skin of wearers of such clothing.

Another object of the invention is to provide a process for making a highly sorbent, active carbon fabric having characteristics such as those described in the preceding paragraph.

Other objects and advantages of the invention will become apparent from the following description of the invention.

SUMMARY OF THE INVENTION

A laminated, highly sorbent, active carbon fabric which is permeable to moisture vapor and resistant to sweat penetration and poisoning, while sorbing substantial quantities of toxic chemical vapors which, absent such sorption by the activated carbon fabric, would penetrate through clothing made of such fabric to the skin of wearers of such clothing.

DESCRIPTION OF THE PREFERRED EMBODIMENT

Figure 1:
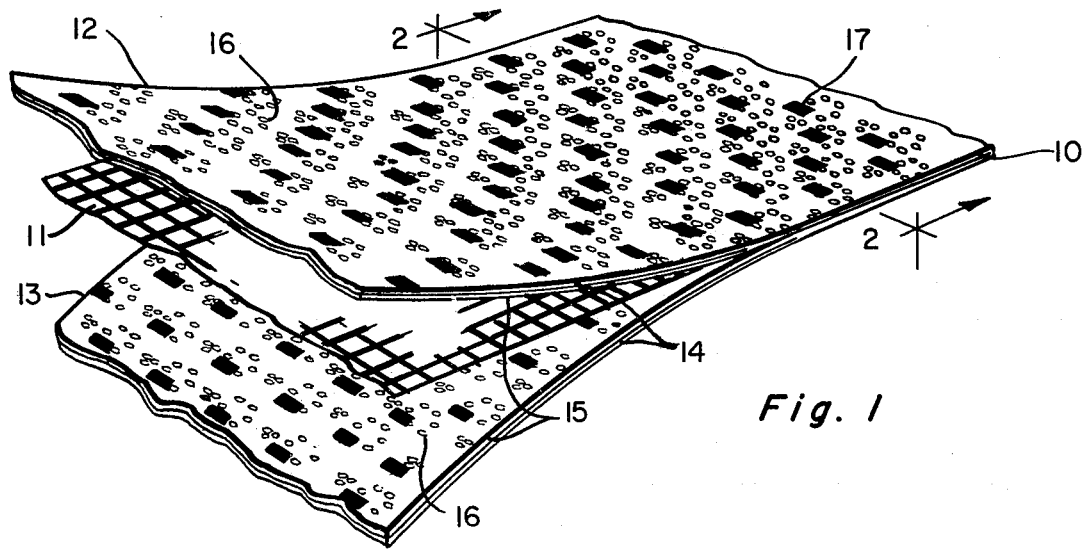

The invention will become apparent from the following description of one embodiment thereof taken in conjunction with the accompanying drawings, in which FIG. 1 illustrates a laminated, highly sorbent, active carbon fabric in accordance with the invention shown in a partially unlaminated condition, i.e. prior to final lamination at the spread apart end of the fabric.

Figure 2:
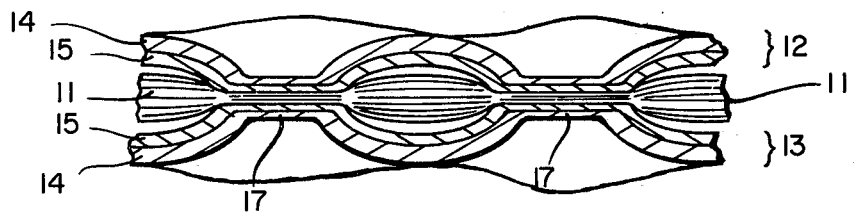

FIG. 2 is a cross-sectional view of a cutaway portion of the fabric of FIG. 1 taken along the plane passing vertically with respect to the fabric along the line 2—2 in FIG. 1.

The present invention is concerned with the formation of a multilayered, usually five-layered, laminated structure comprising an inner woven fabric made of yarns of active carbon produced by carbonizing high polymer yarns forming the fabric and thereafter activating the carbon, two outer layers (webs) of spunbonded non-woven fabric prepared from continuous filaments of a high polymer, and two intermediate layers (mats), one on each side of the active carbon fabric, each overlain by one of the outer layers of spunbonded non-woven fabric, the two intermediate layers produced by a melt-blowing process whereby a melt-blown non-woven fabric layer of discontinuous short fibers is formed on one surface of a spun-bonded, continuous filament, non-woven fabric. The melt-blown layer of non-woven fabric is spot welded to the layer of spun-bonded non-woven fabric at closely spaced apart points. The weight ratio of melt-blown web of discontinuous short fibers to spun-bonded mat of continuous filaments is in the range 0.2:1 to 4:1. The final five-layered, laminated fabric structure is produced by superimposing the layers as described above and fusion welding the five layers together over spaced apart areas as shown in the drawings and further described hereinafter.

In the drawings, reference numeral 10 designates the laminated, active carbon fabric of the invention, which comprises woven active carbon fabric 11, having a surface area of at least 300 $m^2/g$ and serving as the inner layer of the laminated, active carbon fabric, an upper two-ply laminate 12 and a lower two-ply laminate 13, each of which comprises a layer of spunbonded non-woven fabric 14 on the outside of the two-ply laminate of which it is a part and a layer of melt-blown, short-length or discontinuous filamentary, non-woven fabric 15, each of which is adjacent to the woven active carbon fabric in the final five-layered, laminated fabric structure. The layers 14 and 15 of the upper two-ply laminate 12 and of the lower two-ply laminate 13 are held together, as discussed previously, by spot welds 16 spaced apart in a preselected pattern or, in some cases, a plurality of preselected patterns. The spot welds are conventionally applied to layers 14 and 15. After superimposition of the lower two-ply laminate 13, the woven active carbon fabric 11, and the upper two-ply laminate 12, the resulting five-ply structure is fusion welded in a conventional manner over spaced apart areas 17 to produce the final five-layered, laminated, active carbon fabric structure of the invention. This laminated fabric structure is suitable for making protective garments or other structures for protecting human beings or animals from toxic chemical vapors for a reasonable period of time until they can be moved to an area not contaminated by toxic chemical vapors or supplementally protected by other means.

The various layers employed in making the laminated, highly sorbent, active carbon fabric of the present invention may be made by conventional processes. The woven active carbon fabric, for example, may be prepared by spinning high polymer yarns of various types, such as regenerated cellulose yarns of various conventionally produced types, polyacrylonitrile yarns, phenol-formaldehyde yarns, pitch yarns, or other suitable high polymer yarns, weaving such yarns into fabrics, carbonizing the fabrics, and activating the carbonized fabrics, all accomplished conventionally.

The preparation of carbonized and activated carbon yarns and fabrics and the utilization thereof in protective clothing of various types to serve as protection against various hazards may be found disclosed in Bailey et al (British Pat. No. 1,301,101); Peters (U.S. Pat. No. 3,235,323); Doying (U.S. Pat. No. 3,256,206); Dickson et al (U.S. Pat. No. 3,556,712); Miyamichi (U.S. Pat. No. 3,639,140); Henry et al (U.S. Pat. No. 3,744,534); Economy et al (U.S. Pat. No. 3,769,144); McQuade et al (U.S. Pat. No. 3,850,785); and Arons et al (U.S. Pat. No. 4,067,210). It is not intended that the above should be taken as a complete list of patents relating to carbon fabrics or processes by which they may be produced.

The outer layers of spun-bonded, non-woven fabric may be prepared by following procedures disclosed in such patents as Dorschner et al (U.S. Pat. No. 3,692,618); Kinney (U.S. Pat. Nos. 3,338,992 and 3,341,394); Levy (U.S. Pat. No. 3,276,944); Petersen (U.S. Pat. No. 3,502,538); Dobo et al (U.S. Pat. No. 3,542,615); Hartmann (U.S. Pat. Nos. 3,502,763 and 3,509,009); Brock (U.S. Pat. No. 3,748,216); Hansen et al (U.S. Pat. No. 3,855,046); Brock (U.S. Pat. No. 3,855,045); Kawai et al (U.S. Pat. No. 4,080,163); Aoki (U.S. Pat. No. 3,901,760); Kawai et al (U.S. Pat. No. 3,832,281); and Kawai et al (U.S. Pat. No. 3,718,537). The layer (or mat) of melt-blown fibers may be prepared in combination with a web of spun-bonded fibers by following procedures disclosed in such patents as Brock et al (British Pat. No. 1,453,447) and Prentice (U.S. Pat. No. 3,715,251). The preparation of non-woven fibrous webs by melt-blowing techniques is described in such patents as Schwarz (U.S. Pat. No. 3,806,289); Buntin et al (U.S. Pat. No. 3,978,185); Buntin (U.S. Pat. No. 3,972,759); and Prentice (U.S. Pat. No. 3,704,198). Other patents and publications too numerous to undertake listing here relate to various aspects and modifications of the preparation of fibrous webs or mats of either continuous filaments or discontinuous filaments and to methods of combining two or more such webs or mats to obtain laminated fibrous products possessing certain desirable characteristics. Such webs or mats may be made of polyolefin filaments, such as polypropylene or polyethylene filaments of various molecular weights and molecular weight distributions, polyamides of which there are many both of the diamine-dibasic acid type and the amino-acid type (frequently produced from lactams, such as caprolactam), polyesters such as polyethylene glycol terephthalate, polyacetals, polyurethanes, polycarbonates, and polystyrene, as well as other spinnable high polymers. Melt-spinnable high polymers seem to work best; but this does not preclude the use of solution spinnable polymers such as regenerated cellulose or modified regenerated celluloses, the production of which in web form is disclosed in some of the above-mentioned patents. Preferably, at least one of the layers of fibrous web or mat material will be fusible so that spot welding of the outer layer of continuous filament, non-woven structure to the adjacent (intermediate) layer of discontinuous filamentary, non-woven structure may be accomplished and also that the fusion welding over spaced apart areas 17 may be carried out to complete the formation of the laminated, highly sorbent, active carbon fabric of the invention, as previously described. It is important for the purpose of fulfilling the objectives of the invention that the layers of non-woven fabrics be capable of being reasonably strongly adhered to the woven, active carbon fabric material without too greatly reducing the sorption characteristics of the active carbon and also without too greatly reducing the overall breathing capabilities of the laminated structure, thus making for comfortable garments which impart a high degree of protection to the wearers thereof against toxic chemical vapors.

The following example illustrates the process of the invention and describes the makeup of the product and its physical and chemical characteristics.

EXAMPLE 1

A 3.8 oz/yd$^2$ woven active carbon fabric having a surface area of at least 300 m$^2$/g was prepared in accordance with the procedures of Bailey and Maggs, British Pat. No. 1,301,101, employing a woven viscose rayon precursor fabric.

A 1.5 oz/yd$^2$ two-layer laminate produced by Kimberley-Clark Corp. as "Evolution II" fabric comprising one layer of a continuous filament non-woven web of polypropylene melt-spun by a spun-bonding procedure, such as that described in Brock et al, British Pat. No. 1,453,447, and forming on one surface of the continuous filament spun-bond web a non-woven mat of melt-blown, discontinuous microfibers of polypropylene, in accordance with a melt-blowing procedure such as that also described in the British Pat. No. 1,453,447. The non-woven web of continuous polypropylene filaments with the non-woven mat of melt-blown polypropylene microfibers lying thereon was passed between a pair of steel rolls one of which had raised, pointed projections on the surface thereof arranged in a predetermined pattern, this roll being heated sufficiently and sufficient pressure being applied at the nip of the rolls as the superimposed continuous filamentary web and the mat of discontinuous microfibers passed therethrough to cause the formation of spot welds of the two layers, as at 16 in FIG. 1 of the drawing, thus laminating the continuous filamentary web and the discontinuous microfiber mat.

The two-layered laminate described in the preceding paragraph and the woven active carbon fabric described in the first paragraph of this example were laminated to form a five-layered laminate, such as 10 in FIG. 1 of the drawing, by a procedure involving ultrasonically induced fusion, generally of the nature of that described in Ostermeier et al, U.S. Pat. No. 3,949,127, but welding five layers as shown in FIG. 1 of the drawing. The inner layer was the woven active carbon fabric described in the first paragraph of this example; the outer layers were the continuous filament spun-bond web; and the intermediate layers (between the woven active carbon fabric and the continuous filament spun-bond web on each side of the woven active carbon fabric) were composed of the melt-blown, discontinuous microfiber mat. This combination of layers was laminated in an ultrasonic bonding unit manufactured by the James Hunter Machine Company, North Adams, Mass. This unit comprised an ultrasonic horn, manufactured by Bronson Sonic Power Company, positioned over an embossed roll. The several layers of superimposed fabric, as described above, were passed between the ultrasonic horn and the roll. The horn position was adjusted to apply pressure to the fabric bonding areas where projections on the surface of the roll contacted one of the continuous filament spun-bonded web layers 14 of FIGS. 1 and 2. The ultrasonic energy was concentrated at these areas so that, with the pressure being applied, the several layers were fusion welded together over the spaced apart areas 17, as shown in FIGS. 1 and 2 of the drawing.

The resulting five-layered laminate produced as described above was found to have the characteristics shown in Table 1, the control (without the woven active carbon fabric) being a four-layered laminate in which two layers of the non-woven mat of melt-blown (MB) discontinuous microfibers were contiguous to each other while the two layers of the continuous filament spun-bond (SB) web were on the outside, the four layers being ultrasonically fusion welded together in substantially the same manner as the five-layered laminate containing the woven active carbon fabric.

Table 1

| SB/MB Laminates | Weight ($oz/yd^2$) | Air Permeability ($ft^3/min/ft^2$) | Thickness (in.) | Hydrostatic Resistance (cm.) | Dynamic $CCl_4$ Vapor Sorption ($mg/cm^2$) |
|---|---|---|---|---|---|
| with carbon fabric | 6.2 | 16 | 0.045 | 97 | 2.2 |
| without carbon fabric (control) | 3.3 | 29 | 0.025 | 45 | — |

The appreciable air permeability and low thickness (in comparison with the 0.08 inch thickness of the presently used active carbon-impregnated polyurethane foam laminates) indicated potentially good garment comfort. The hydrostatic resistance indicated good resistance to the passage of liquid sweat through the spun-bonded and melt-blown layers into the active carbon layer. This avoidance of sweat poisoning assures retention of sorption capacity when protective garments are worn in warm climates. The $CCl_4$ vapor sorption level of 2.2 $mg/cm^2$ was sufficiently high to indicate suitability for use in protective clothing since a $CCl_4$ vapor sorption level of 1.2 $mg/cm^2$ has been considered satisfactory in the thicker presently used active carbon impregnated polyurethane foam laminate. See Military Specification MIL-C-43858(GL) for the sorption determination. It is, therefore, apparent that a substantial advance has been made in the protection of human beings against toxic chemical vapors while providing comfort and resistance to sweat poisoning in clothing affording such improved protection.

It will be understood that various changes in the details, materials and arrangements of parts which have been described and illustrated in order to explain the nature of the invention, may be made by those skilled in the art within the principle and scope of the invention.

We claim:

1. A laminated, highly sorbent, active carbon fabric, comprising in combination
   (a) a middle layer consisting of flexible fabric constructed of fibrous active carbon material, said fibrous active carbon material having a surface area of at least 300 $m^2/g$; and
   (b) a pair of laminated layers of reinforcing material for reinforcing said middle layer, one of said pair of laminated layers being positioned on each side of said middle layer, each of said laminated layers being constructed of a spunbonded, non-woven fabric layer made from polypropylene and a highly water resistant, melt-blown, fibrous layer made from polypropylene, said laminated layers being spot-welded to said middle layer at spaced apart points.

2. A laminated, highly sorbent, active carbon fabric according to claim 1, wherein said middle layer is produced from a regenerated cellulose fabric.

3. A laminated, highly sorbent, active carbon fabric according to claim 1, wherein said middle layer is made of a woven fibrous active carbon material.

4. A laminated, highly sorbent, activated carbon fabric according to claim 3, wherein said woven fibrous active carbon material is produced from a woven regenerated cellulose fabric.

5. A laminated, highly sorbent, active carbon fabric according to claim 1, wherein said melt-blown fibrous layers are adjacent to said middle layer and said spunbonded, non-woven fabric layers are disposed away from said middle layer, whereby said spunbonded, non-woven fabric layers form the exterior surfaces of said laminated, active carbon fabric.

6. A process of making a highly sorbent, active carbon fabric which comprises the steps of:
   a. forming a fabric from a carbonizable and activatable polymeric yarn;
   b. carbonizing said carbonizable and activatable polymeric yarn fabric;
   c. activating said carbonized fabric;
   d. forming a spunbonded, non-woven fabric of polypropylene filaments;
   e. forming on one face of said spunbonded, non-woven fabric a layer of melt-blown fibers of polypropylene to produce a laminate having a layer of spunbonded, non-woven fabric of polypropylene filaments and a layer of melt-blown fibers of polypropylene;
   f. assembling a composite fabric comprising a plurality of layers of said fabrics and laminates having at least one layer of said carbonized fabric sandwiched between a pair of said laminates, said carbonized fabric being adjacent to said layer of melt-blown fibers of polypropylene in each of said laminates; and
   g. laminating said composite fabric in a laminating machine having a heated, embossed roll provided with elongated pins on the surface thereof for applying pressure to said composite fabric at a temperature above room temperature until said composite fabric is sufficiently spot welded where said elongated pins contact said composite fabric for said plurality of layers of said composite fabric to be firmly held together at spaced apart points while maintaining flexibility and high air permeability through the resulting laminated composite fabric.

7. A process according to claim 6, wherein said carbonizable and activatable polymeric yarn fabric is a cellulose yarn fabric.

8. A process according to claim 7, wherein said of carbonizing said cellulosic yarn fabric is carried out by impregnating said cellulosic yarn fabric with a solution of a Lewis acid, drying the impregnated cellulosic yarn fabric, heating said impregnated and dried cellulosic yarn fabric in an inert atmosphere in a temperature range and for a time sufficient to produce carbonization of said cellulosic fabric, and thereafter heating the resulting carbonized fabric in an activating gas atmosphere in a temperature range and for a time sufficient to activate said carbonized fabric.

9. A process according to claim 8, wherein said cellulosic yarn fabric is a regenerated cellulose yarn fabric.

10. A process according to claim 7, wherein said cellulosic yarn fabric is a regenerated cellulose yarn fabric.

* * * * *